US007259952B2

(12) United States Patent
Flasza et al.

(10) Patent No.: US 7,259,952 B2
(45) Date of Patent: Aug. 21, 2007

(54) PROCESS CONTROL INSTRUMENT INTRINSIC SAFETY BARRIER

(75) Inventors: Michael D. Flasza, Schaumburg, IL (US); Stanislaw Bleszynski, Lakefield (CA)

(73) Assignee: Magnetrol International, Inc., Downers Grove, IL (US)

( * ) Notice: Subject to any disclaimer, the term of this patent is extended or adjusted under 35 U.S.C. 154(b) by 0 days.

(21) Appl. No.: 11/243,038

(22) Filed: Oct. 4, 2005

(65) Prior Publication Data

US 2006/0017647 A1 Jan. 26, 2006

Related U.S. Application Data

(62) Division of application No. 10/675,666, filed on Sep. 30, 2003, now Pat. No. 6,980,174.

(60) Provisional application No. 60/467,853, filed on May 5, 2003, provisional application No. 60/414,847, filed on Sep. 30, 2002.

(51) Int. Cl.
*H02H 9/00* (2006.01)

(52) U.S. Cl. ...................................... 361/119; 361/113

(58) Field of Classification Search ................ 361/113, 361/118, 119
See application file for complete search history.

(56) References Cited

U.S. PATENT DOCUMENTS

| | | | | |
|---|---|---|---|---|
| 6,640,084 | B2 | 10/2003 | Pande et al. | 455/3.01 |
| 6,642,902 | B2 | 11/2003 | Gustafson | 343/791 |
| 6,906,668 | B2 | 6/2005 | Rawnick et al. | 343/767 |
| 6,980,174 | B2 * | 12/2005 | Flasza et al. | 343/850 |

* cited by examiner

*Primary Examiner*—Stephen W. Jackson
(74) *Attorney, Agent, or Firm*—Wood, Phillips, Katz, Clark & Mortimer

(57) ABSTRACT

A process control instrument includes a circuit board having a control circuit for generating or receiving a high frequency signal. An antenna includes an electrical conductor. An intrinsic safety circuit couples the control circuit to the antenna and comprises a microstrip transmission line on the circuit board electrically connecting the control circuit to the electrical conductor. A safety stub has a first end electrically connected to the transmission line proximate the electrical conductor and a second end connected to a ground of the control circuit.

18 Claims, 7 Drawing Sheets

PROCESS CONTROL INSTRUMENT INTRINSIC SAFETY BARRIER

CROSS REFERENCE

This application claims priority of application No. 60/414,847 filed Sep. 30, 2002, application No. 60/467,853 filed May 5, 2003 and is a divisional of application No. 10/675,666 filed Sep. 30, 2003 now U.S. Pat. No. 6,980,174.

FIELD OF THE INVENTION

This invention relates to a process control instrument and more particularly, to an intrinsic safety barrier for a process control instrument.

BACKGROUND OF THE INVENTION

Industrial processes often require measuring the level of liquid or other material in a tank. Many technologies are used for level measurement. With contact level measurement some part of the system, such as a probe, must contact the material being measured. With non-contact level measurement the level is measured without contacting the material to be measured. One example is non-contact ultrasound, which uses high-frequency audio waves to detect level. Another example is use of high-frequency or microwave RF energy. Microwave measurement for level generally uses either pulsed or frequency modulated continuous wave (FMCW) signals to make product level measurements. This method is often referred to as through air radar. Through air radar has the advantage that it is non-contact and relatively insensitive to measurement errors from varying process pressure and temperature. Known radar process control instruments operate at frequency bands of approximately 6 Ghz or 24 Ghz.

While tank radar process control instruments measure product level without contact, in most cases part of the instrument must be mounted on the tank and a microwave antenna must be inserted into the tank in order to function. Problems can arise if the medium in the tank is "hazardous", i.e. it is subject to ignition and/or explosion. Any equipment installed in such locations must meet strict requirements in order to assure that any device, including tank level measurement devices, cannot ignite the vapors, etc., that may be present in such a tank. One method for achieving safe operation is to include a so-called intrinsic safety (IS) barrier in the system design. The concept of the IS barrier is to guarantee that sufficient amounts of energy cannot be transferred into the tank, in this case via the antenna, to cause an explosion. The IS, or energy-limiting barrier, may consist of zener diodes, current limiting resistors, and fuses so that energy levels at the antenna remain safely below published, known ignition curves for the particular process. IS barriers are traditionally placed in the input connections of a process control instrument. Doing so may cause loss of loop power and supply voltage due to the protective components, and produce ground loop product problems, which are difficult to overcome in multiple unit installations. An optimum location for the IS barrier is at the antenna connection. However, placing an IS barrier at the RF stages of the instrument could pose problems. Circuit design factors such as output impedance matching, return loss, agency compliance, and others are typical concerns. Radiated spectrum compliance, and in some cases radar receiver performance, can often be aided by filtering at the antenna connection.

An additional requirement for industrial measurements such as radar process control instruments is a dielectric withstand test. As a measure of reliability, the power connections are shorted together and a relatively high DC voltage is applied between the shorted loop leads and the instrument case (earth ground). To pass the test, the circuit electronics must be able to withstand this voltage from its circuitry to earth ground. An IS barrier placed at the antenna connection may be called upon to withstand this voltage.

The present invention is directed to overcoming one or more of the problems discussed above in a novel and simple manner.

SUMMARY OF THE INVENTION

In accordance with the invention, there is disclosed a process control instrument using distributed elements in the circuit design for intrinsic safety.

Broadly, in accordance with one aspect of the invention, there is disclosed a process control instrument comprising a circuit board having a control circuit for generating or receiving a high frequency signal. An antenna includes an electrical conductor. An intrinsic safety circuit couples the control circuit to the antenna and comprises a microstrip transmission line on the circuit board electrically connecting the control circuit to the electrical conductor. A safety stub has a first end electrically connected to the transmission line proximate the electrical conductor and a second end connected to a ground of the control circuit.

It is a feature of the invention that the safety stub comprises a trace line on the circuit board.

It is another feature of the invention that the second end of the trace line includes conductive vias connected to the ground.

It is still another feature of the invention that the trace line comprises a quarter wavelength trace line.

It is still another feature of the invention that the safety stub comprises a wire element.

It is yet another feature of the invention that the intrinsic safety circuit further comprises a radial stub electrically connected to the transmission line.

It is an additional feature of the invention that the safety stub has a length selected to resonate at a select frequency of interest.

It is yet another feature of the invention that the safety stub comprises a trace line on the circuit board having a width of at least 2.0 mm and may be about 2.5 mm and having a length of about 10 mm.

There is disclosed in accordance with another aspect of the invention a process control instrument comprising a circuit board having first and second sides and a control circuit on the first side for generating or receiving a high frequency signal. An antenna includes a coaxial electrical conductor having a center conductor and a shield. An intrinsic safety circuit couples the control circuit to the antenna comprising the circuit board first side including a first microstrip stub electrically connected to the control circuit and a ground plane proximate the transmission line. The circuit board second side includes a second microstrip stub, directly underlying the first microstrip stub, electrically connected to the center conductor, and a ground pad, underlying the ground plane, electrically connected to the shield.

It is a feature of the invention that the first microstrip stub and the second microstrip stub are each of quarter wavelength.

It is another feature of the invention to provide a second ground plane on the circuit board second side proximate the second microstrip stub and the ground pad. The spacing between the ground plane and the ground pad is at least 2.0 mm.

It is yet another feature of the invention that the ground pad is configured to resonate at an operating frequency.

It is a further feature of the invention that the ground pad comprises a microstrip line connected between opposite radial stubs.

Further features and advantages of the invention will be readily apparent from the specification and from the drawings.

DETAILED DESCRIPTION OF THE INVENTION

Figure 1:
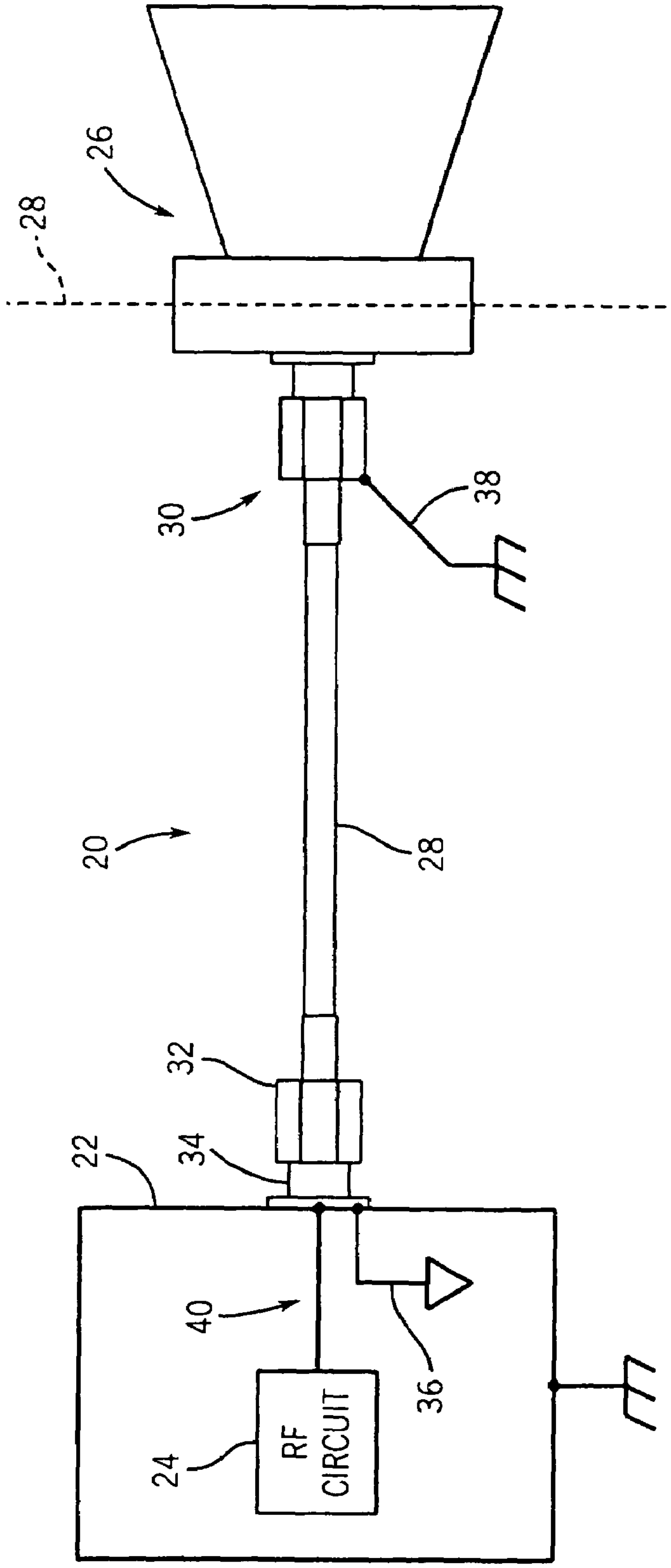
FIG. 1 PRIOR ART
FIG. 1 is a generalized view, partially in block diagram form, of a prior art through air radar process control instrument.

Referring initially to FIG. 1, a typical prior art through air radar process control instrument 20 comprises a conventional housing, represented by a block 22, housing various control circuits, including radio frequency (RF) circuits 24 for generating or receiving a high frequency microwave signal. An antenna 26 is mounted on a tank, represented by a dashed line 28, to direct electromagnetic energy toward a material in the tank. A typical circuit to couple a microwave signal between the RF circuit 24 and the antenna 26 uses a coaxial cable 28 having connectors 30 and 32. The first connector 30 is connected to the antenna 26. The second connector 32 is connected to a connector 34 operatively located in the housing 22. The coaxial cable 28 includes a center conductor and an outer shield, as is well known. The coaxial cable outer shield is usually connected to the circuit ground of the electronics, as illustrated at 36. The outer shield is also usually connected to earth ground, or the so-called intrinsic safe ground, via a separate connection 38 whose safety characteristics are well defined. The center conductor is connected to the RF circuit 24 with a wire or other conductive element 40.

The antenna may consist of an active element or "launcher" which can have various designs, but which may consist of, for example, a one quarter wavelength dipole inserted into a waveguide. The active element can create safety concerns if it is capable of conducting energy levels into the tank that can cause ignition.

One approach to limiting the energy to the center conductor 40 of the coaxial cable 28 might be to place an intrinsic safety (IS) barrier proximate the antenna connection 34. This IS barrier might consist of resistors, diodes, fuses, etc., and is intended to limit the energy from the center conductor to levels below the established energy limit curves for the process. However, such an IS barrier must be controlled and optimized at microwave frequencies for several key parameters such as return loss and output impedance. Moreover, with the frequencies involved in microwave radar (5-8 Ghz or 22-25 Ghz) circuit design using discrete components can be extremely difficult.

Safety agencies have various requirements for printed circuit (PC) board layouts that must be followed to satisfy intrinsically safe requirements. A PC board trace must be of a certain minimum width, must be a minimum distance from other traces, and must have a redundant connection into a safe ground to be considered infallible.

The present invention relates to combining concepts of distributed-element microwave design with agency intrinsic safe ground requirements. Particularly, circuit elements such as inductors, capacitors, transmission lines, band pass filters, etc., are constructed for microwave frequencies by using transmission-line (microstrip) elements, which are PC board traces of controlled geometry (width/length, shape, etc.) while satisfying intrinsic safe ground requirements.

Figure 2:
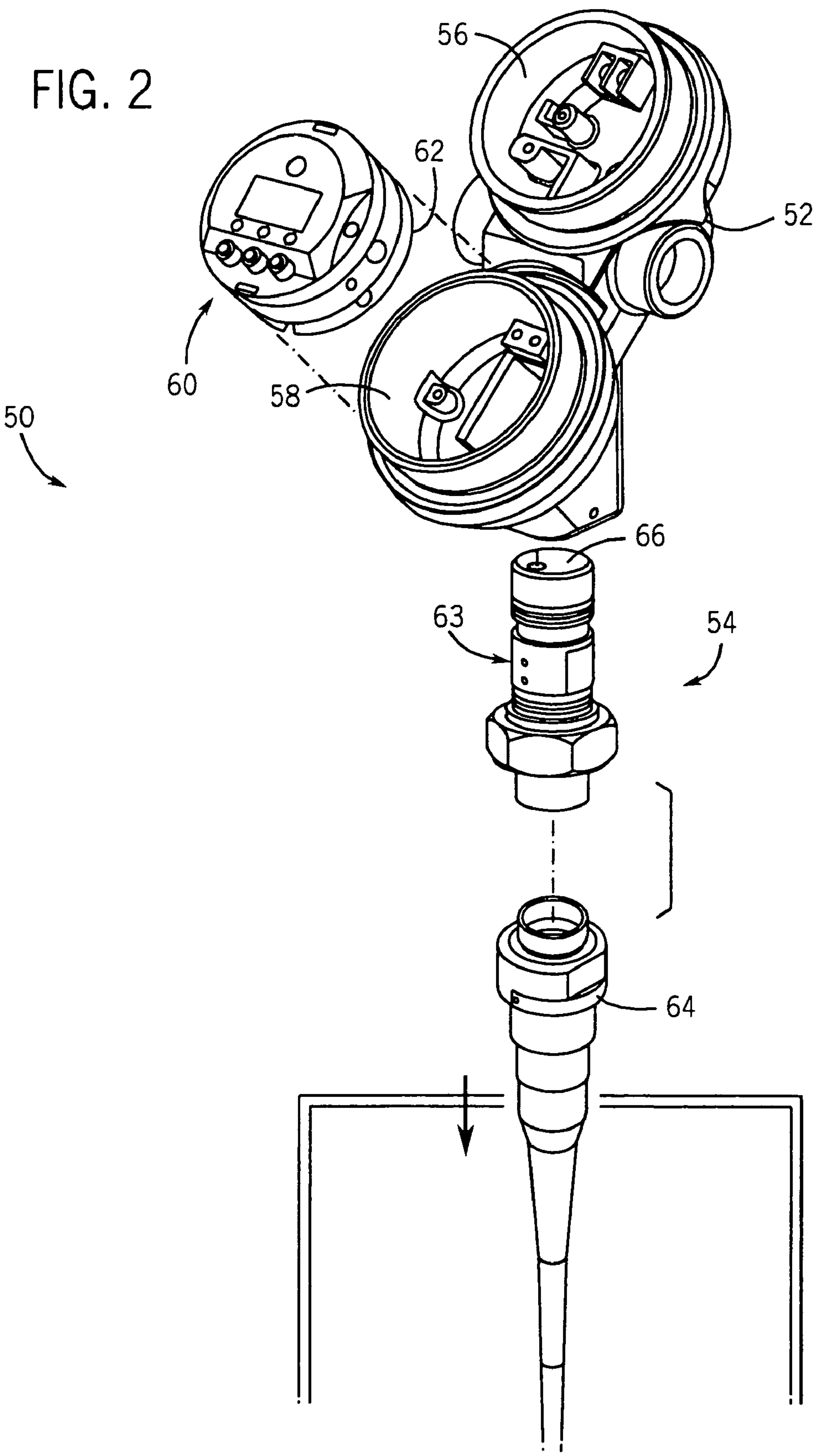
FIG. 2 is an exploded view of a through air radar process control instrument in accordance with the invention.

Referring to FIG. 2, a through air radar process control instrument 50 in accordance with the invention is illustrated. The instrument 50 includes a housing 52 and an antenna 54. The housing 52 includes a wiring compartment 56 and an electronics compartment 58. The electronics compartment 58 receives a control module 60 including a circuit board 62 having an RF circuit similar to the RF circuit 24 of FIG. 1. The antenna 54 comprises a connector 63 having an active element or loop launcher (not shown) and a dielectric rod 64. The loop launcher is connected to a coaxial cable 66 which is electrically coupled, as described below, to the circuit board 62 of the control module 60. As is conventional, the dielectric rod 64 propagates an electrical magnetic wave from the loop launcher into the air where the electromagnetic energy leaves the dielectric and propagates in free space, in the original direction along the axis of the rod 64. As is apparent, the dielectric rod antenna 64 could be replaced by a horn antenna, such as illustrated in FIG. 1.

The present invention is not directed to the particular RF circuit for generating or receiving a high frequency microwave signal or to the antenna, but rather to an intrinsic safety circuit for coupling the RF circuit to the antenna.

Figure 3:
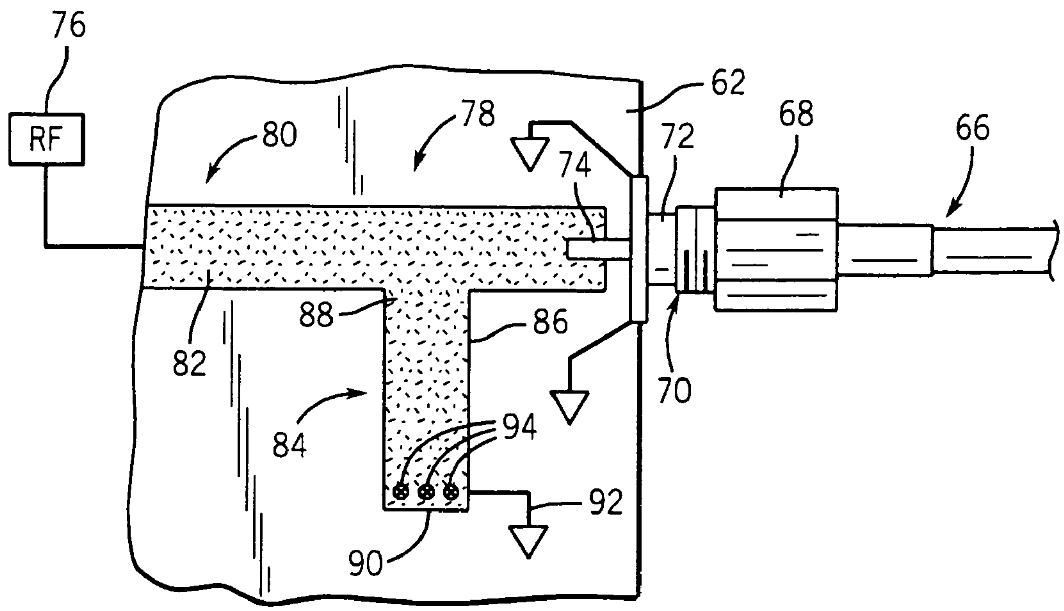
FIG. 3 is a detailed plan view of an intrinsic safety circuit of the instrument of FIG. 2 according to one embodiment of the invention.

Referring to FIG. 3, the coaxial cable 66 includes an end connector 68. A portion of the printed circuit board 62 has a coaxial connector 70 having a conductive housing 72 and a center conductor 74, as is conventional. Particularly, the conductive housing 72 is electrically connected in a conventional manner to the shield of the coaxial cable 66. The center conductor 74 is electrically connected to the center conductor of the coaxial cable 66, as is well known.

The printed circuit board 62 includes a control circuit, which may be of conventional nature, and having an RF circuit, illustrated in block form as element 76. The RF control circuit 76 generates or receives a high frequency microwave signal, as discussed above. The microwave signal may be either a pulsed signal or a frequency modulated continuous wave (FMCW) signal. In accordance with the invention, an intrinsic safety (IS) barrier or circuit 78 couples the RF circuit 76 to the antenna 54, see FIG. 2. The intrinsic safety circuit 78 includes a microstrip transmission line 80 comprising a trace 82 on the printed circuit board 62 electrically connecting the RF circuit 76 to the center conductor 74. A safety stub 84, comprising a trace 86 on the printed circuit board, has a first end 88 electrically connected to the transmission line 80 proximate the electrical conductor 74 and a second end 90 connected to a control circuit ground 92.

In the embodiment of FIG. 3, the safety stub 84 comprises a microstrip stub line 86 of quarter wavelength at the operating frequency. As is well known in the art, such a microstrip appears at its ungrounded end as an open circuit. Therefore, it has little or no effect on the circuit operation at its center frequency. The effect of this connection is that, at low frequencies, the entire circuit, including the antenna center conductor 74, is at ground potential. If the microstrip is sufficiently wide and is safely grounded, the circuit 78 is intrinsically safe. Particularly, it is capable of conducting high energy levels to the center conductor 74 and is safe from the point of view that its width, spacing and grounding requirements have been met.

For microstrips to have certain characteristic impedance, an important design parameter, the thickness of the PC board 62, its relative dielectric value, and the geometry of the trace 86 must be known. For PC board materials of thickness 0.062 inches and a relative dielectric value of 4.5, and for a characteristic impedance of 50 Ohms, an approximate trace width is about 2.5 mm. At frequencies of 6 Ghz, a quarter wavelength on the PC board 62 might be about 10 mm. Practical values for the trace widths readily exist that are wide enough to meet agency width requirements of 2 mm. As is apparent, different dimensions would be used for different frequencies. Spacing requirements are satisfied by keeping other circuitry away from the IS ground area. Redundant requirements may be satisfied by triple conductive vias 94 through the printed circuit boards 62 connected to a conventional ground plane, represented schematically at 92, on an opposite side of the circuit board 62 to satisfy infallible ground requirements. As is apparent, conductive vias are not required for the claimed invention.

As is apparent, other configurations are possible for the distributed element network to be placed at the antenna connector 70 that can be used to meet intrinsic safety ground requirements and not affect the microwave circuit, as in FIG. 3, or to alter the output characteristic to the circuit for a functional reasons, and still retain the intrinsic safety ground feature. Examples are shown in FIGS. 4 and 5.

Figure 4:
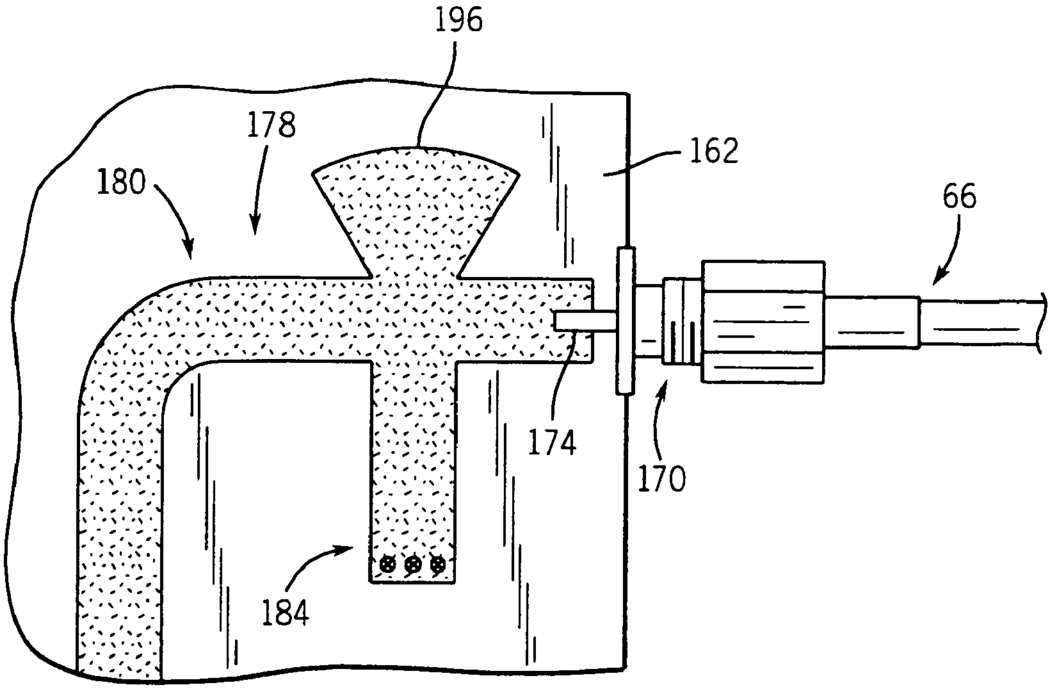
FIG. 4 is a perspective view of a first alternative to the intrinsic safety circuit of FIG. 3.

Referring initially to FIG. 4, a printed circuit board 162 includes an intrinsic safety circuit 178. For simplicity, elements similar to those of the embodiment of FIG. 3 are illustrated using similar reference numerals in the 100 series (similarly FIG. 5 uses similar reference numerals in the 200 series). Such elements, unless different, are not described in detail.

The intrinsic safety circuit 178 of FIG. 4 differs from the intrinsic safety circuit 78 of FIG. 3 in the addition of a radial stub 196 electrically connected to the transmission line 180 proximate the center conductor 174. The radial stub 196 forms a broadband short circuit that can reduce emissions into unwanted spectral bands. A quarter wavelength shorted stub 184 provides the infallible ground without affecting the operation of the radial stub 196. This configuration may be used in applications seeking, for example, some band rejection filtering over a larger bandwidth.

Figure 5:
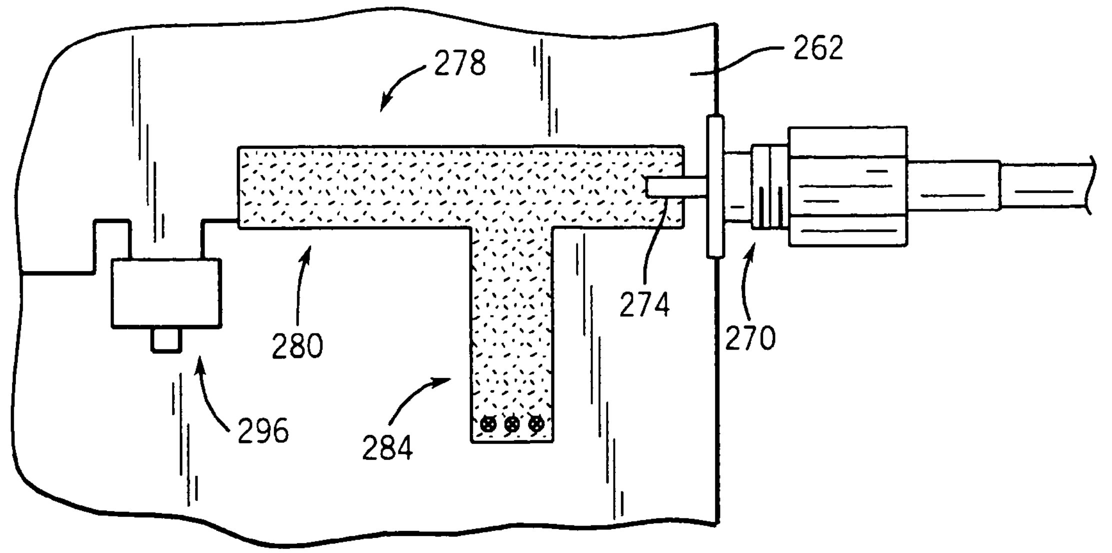
FIG. 5 is a perspective view of a second alternative to the intrinsic safety circuit of FIG. 3.

FIG. 5 illustrates an intrinsic safety circuit 278 in which a safety stub 284 is not quarter wavelength. As is known, a length less than quarter wavelength can be used to simulate an inductor. A shorted stub of more than quarter wavelength but less that half wavelength may be used to simulate a capacitor. These configurations are used to match and/or tune the other distributed and discrete circuit elements for the specific needs of the particular circuit. For example, in the illustrated embodiment, distributed inductance may be used to resonate or tune out the parasitic capacitance of a detector diode 296. Again, the shorted safety stub 284 provides necessary safety ground for the antenna connection.

Figure 6:
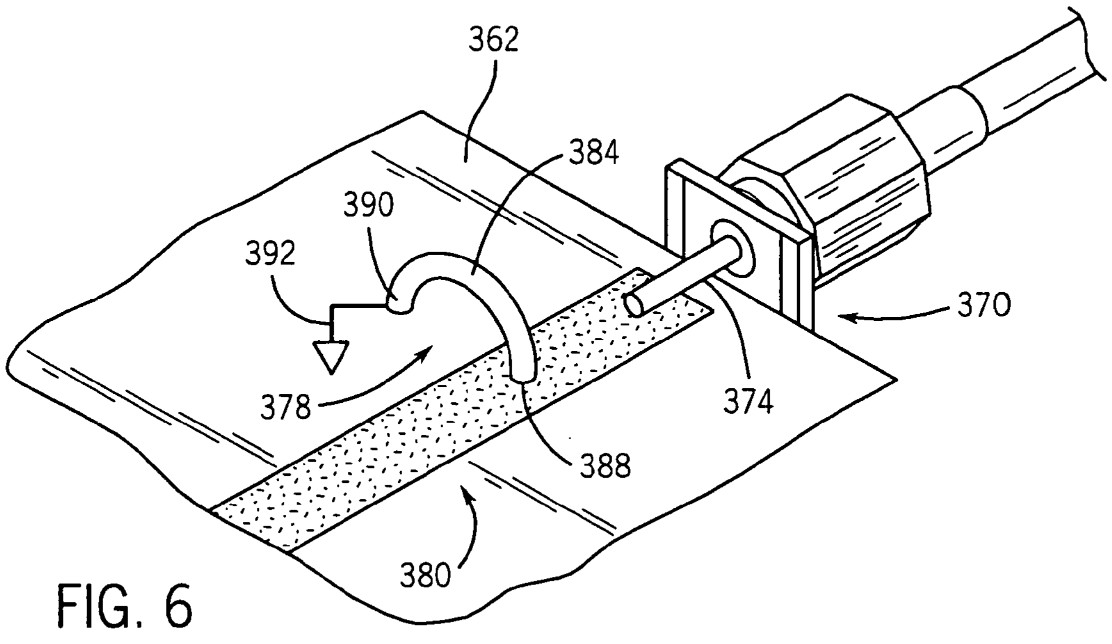
FIG. 6 is a perspective view of a third alternative to the intrinsic safety circuit of FIG. 3.

Referring to FIG. 6, a printed circuit board 362 for a further embodiment of the invention is illustrated. Again, reference numerals similar to those of FIG. 3 are in a 300 number series. The circuit board 362 includes an intrinsic safety circuit 378. The intrinsic safety circuit 378 differs from the intrinsic safety circuit 78 of FIG. 3 in using an open air quarter wave stub wire 384 connected at an end 388 to the transmission line 380 and at an opposite end 390 to ground 392.

While each of the variations of FIGS. 3-6 shows a coaxial connector having a center conductor connected to the transmission line, as is apparent the connectors could be eliminated so that the center conductor in each embodiment comprises the center conductor of the coaxial cable 66 itself soldered or otherwise coupled to the particular transmission line.

As described above, the typical method to couple a microwave signal from its source outside a tank, such as the RF circuit 76 of FIG. 3, to an antenna inside the tank, such as the antenna 54 of FIG. 2, is via a coaxial cable, such as the coaxial cable 66 of FIG. 2. The outer conductor or shield is usually connected to earth ground. Problems can arise if the shield is directly connected to circuit ground of the control module 60. In accordance with the invention, the through air radar process control instrument 50, in another embodiment of the invention, has complete DC and AC isolation from the earth ground present at the antenna.

Figure 7A:
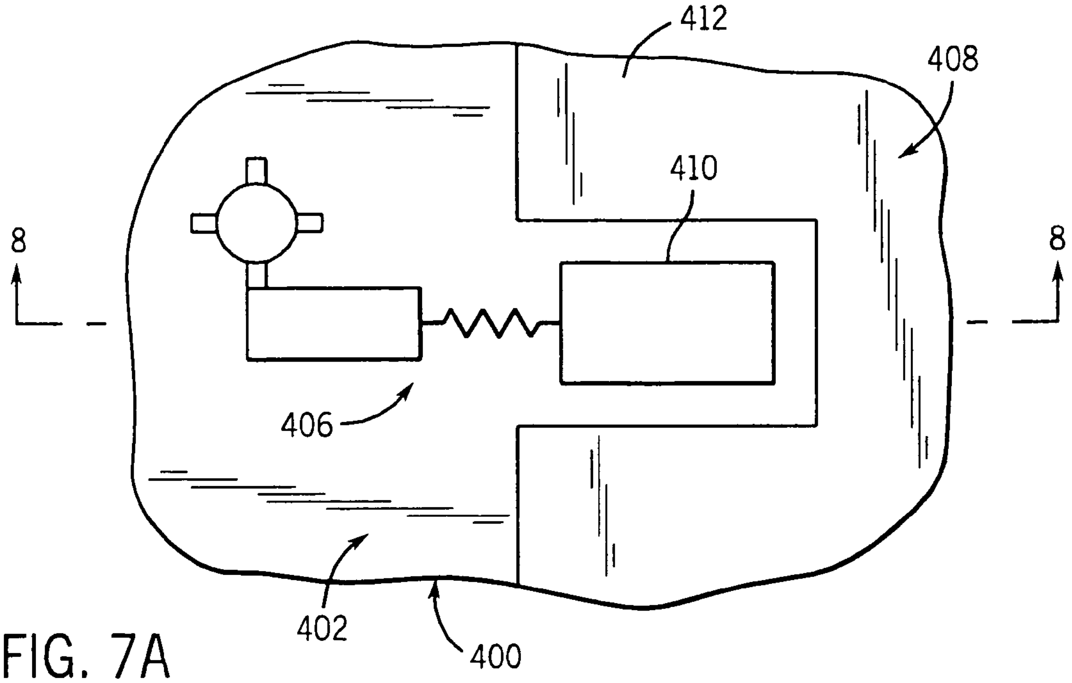
FIGS. 7A and 7B comprise a partial top and bottom plan view, respectively, of a circuit board for the process control instrument of FIG. 2 according to a second embodiment of the invention.
Figure 7B:
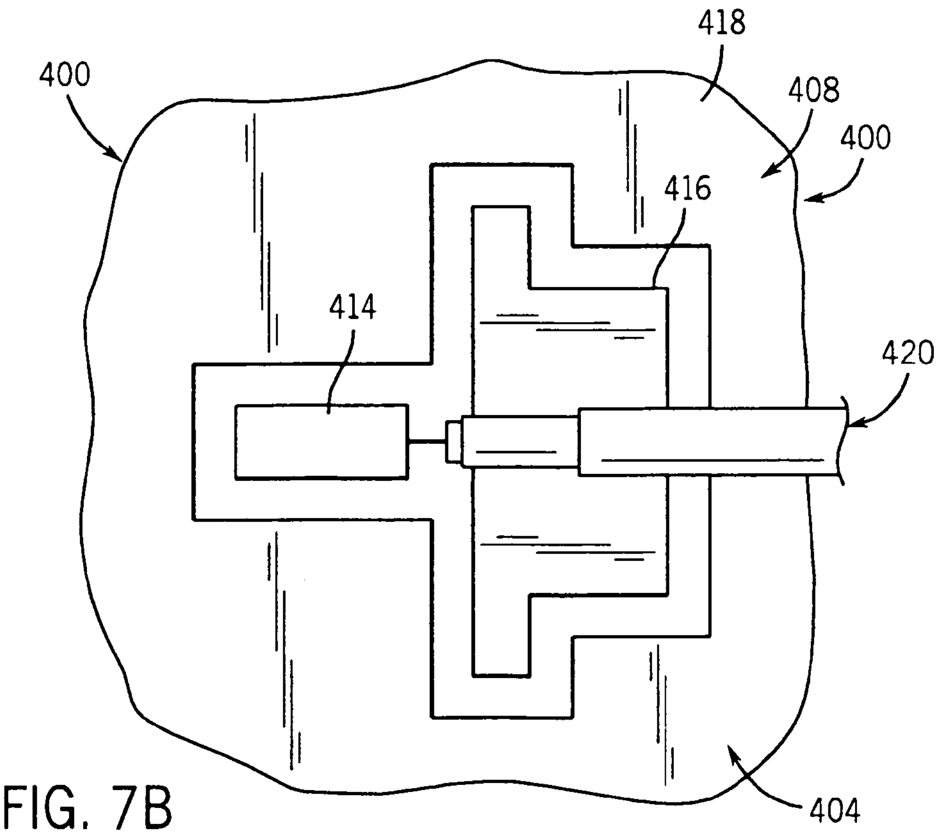
Figure 8:
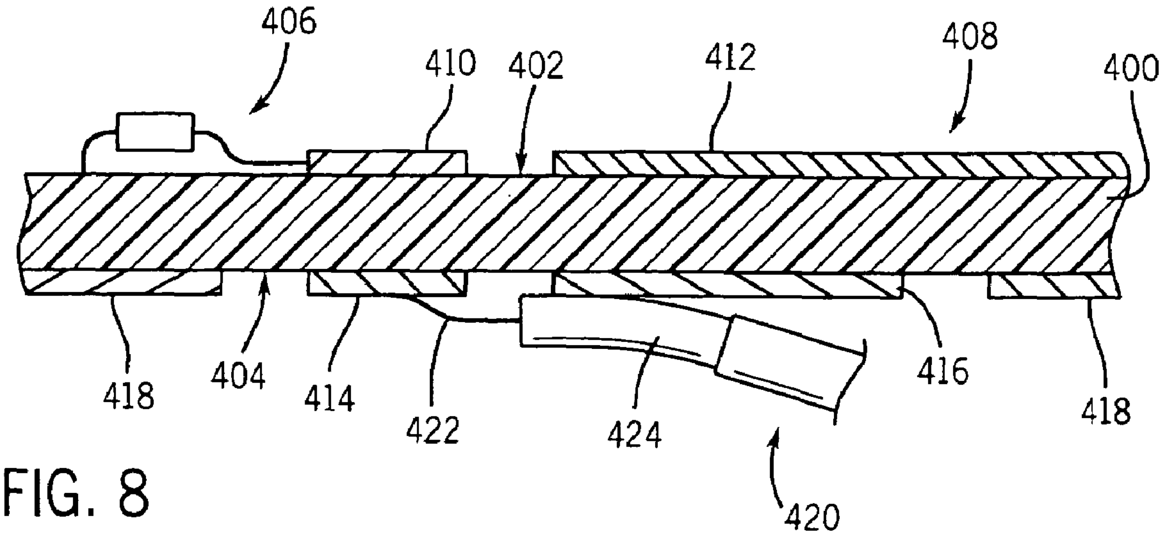
FIG. 8 is a sectional view taken along the line 8-8 of FIG. 7A.

Referring to FIGS. 7A, 7B and 8, a printed circuit board 400 is illustrated. As is apparent, the printed circuit board 400 can be substituted for the printed circuit board 62 of FIG. 2. The printed circuit board 400 includes a first side 402, see FIG. 7A and a second side 404, see FIG. 7B. Referring initially to FIG. 7A, a control circuit including an RF circuit 406 on the first side 402 generates or receives a high frequency microwave signal. An intrinsic safety (IS) circuit 408 comprises a microstrip quarter wavelength first stub 410 on the first side 402 electrically connected to the control circuit 406. Additional PC board area on the first side 402 around the first stub 410 is filled in as a ground plane 412.

On the PC boards second side 404, see FIG. 7B, the IS circuit 408 further comprises a microstrip quarter wavelength second stub 414 placed directly underneath the first stub 410, as shown in FIG. 8, in such a way that the two stubs 410 and 414 couple RF energy efficiently at microwave frequency. As is apparent, there is no galvanic electrical connection between the stubs 410 and 414. Particularly, the stubs 410 and 414 are separated by the dielectric material of the PC board 400, which is typically about 0.063 inches thick. Additionally, a larger copper ground pad 416 is placed directly underneath the ground plane 412. The ground pad 416 likewise has no direct connection to the ground plane 412. Advantageously, the ground pad 416 is a resonant structure to prevent the propagation of circulating RF currents in the shield. Moreover, the structures 414 and 416 are surrounded by a ground plane 418, as shown.

A coaxial cable 420, similar to the coaxial cable 66 of FIG. 2, has a center conductor 422 and a conductive outer shield 424. The center conductor 422 is soldered to the second stub 414. The shield 424 is soldered or otherwise electrically connected to the ground pad 416. As such, the described structures couple microwaves effectively through the board 400 without a direct electrical connection path in either the center conductor 422 or ground shield 424. Microwaves can be effectively transmitted and received through this barrier, which uses the entire dielectric isolation afforded by the thickness of the PC board material 400.

The described intrinsic safety circuit 408 is inexpensive as it only uses distributed PC board traces and no discrete components. Frequencies to be transmitted and received may be tuned via the size and length of the stubs 410 and 414. Since these quarter wavelength stubs 410 and 414 effectively couple only RF energy at the resonant frequencies, which is determined by the physical size and length as well as thickness and dielectric constant of the PC board material, frequencies below or above the desired microwave frequency are not effectively coupled by the structure, affording a desirable filter characteristic.

Adequate spacing, greater than 2 mm, is maintained between the quarter wavelength stub 414, ground pad 416 and ground plane 418 to satisfy agency requirements.

The control circuit 406 can be a transmitter, receiver, or any type of circuit that must couple microwave energy to an antenna. The length and width of the stubs 410 and 414 determine the frequency of most efficient coupling (center frequency) and the stubs characteristic impedance for impedance matching purposes. In an exemplary embodiment of the invention, 7 mm by 2.5 mm stubs 410 and 414 are used with a typical PC board thickness of 0.063 inches and dielectric constant of 4.5 to effectively couple signals in the 6 Ghz range. Stub length/width/impedance may be varied for other operating frequencies and/or different substrate materials.

As is apparent, shape of either the second stub 414 or coax ground pad 416 may be different from those shown in FIG. 7B. Regardless, the design must achieve full galvanic isolation of both cable connections while allowing microwave energy to pass through, while still achieving high dielectric strength, and allowing minimum spacing to be observed between the coax ground pad 416 and circuit ground in accordance with safety requirements.

Figure 9:
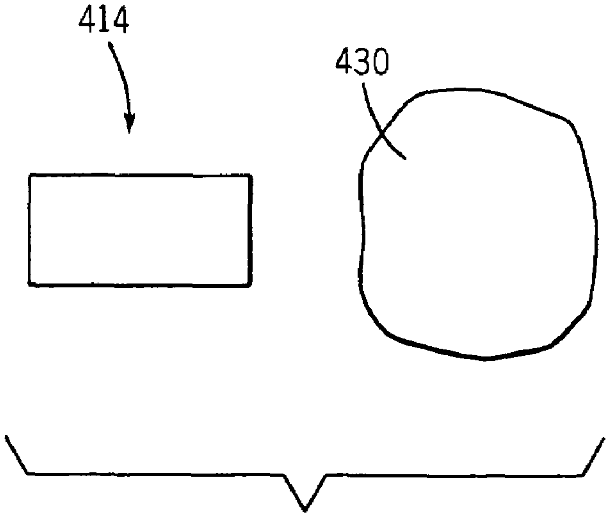
FIGS. 9, 10 and 11 illustrate variations of distributed elements for circuit structures of the embodiment of FIG. 7B.
Figure 10:
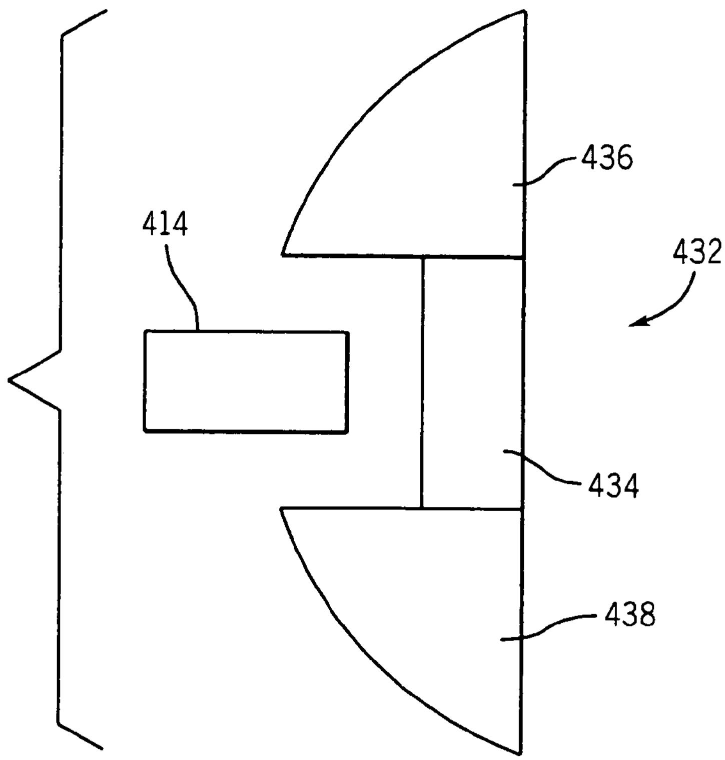
Figure 11:
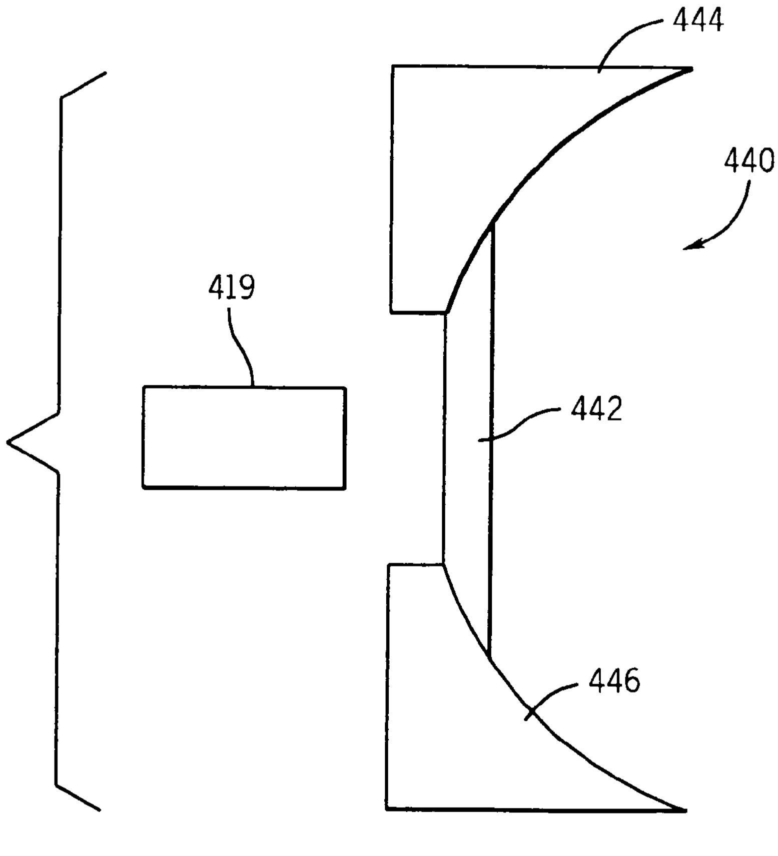

FIGS. 9, 10 and 11 illustrate other possible configurations for the coaxial cable connection. FIG. 9 illustrates the quarter wavelength second stub 414 proximate a non-resonant, irregular shaped ground pad 430. FIG. 10 illustrates a ground pad 432 including a microstrip line 434 connected between radial stubs 436 and 438. FIG. 10 illustrates a ground pad 440 including a microstrip 442 connected between alternative radial stubs 444 and 446 intended for broadband requirements.

Thus, in accordance with the invention, intrinsic safety circuit is provided for coupling a high frequency microwave signal to an antenna in a through air radar process control instrument.

We claim:

1. A process control instrument comprising:

a circuit board having a control circuit for generating or receiving a high frequency signal;

an antenna including an electrical conductor; and an intrinsic safety circuit coupling the control circuit to the antenna comprising a microstrip transmission line on the circuit board electrically connecting the control circuit to the electrical conductor, and a safety stub having a first end electrically connected to the transmission line proximate the electrical conductor and a second end connected to a ground of the control circuit.

2. The process control instrument of claim 1 wherein the safety stub comprises a trace line on the circuit board.

3. The process control instrument of claim 2 wherein the second end of the trace line includes conductive vias connected to the ground.

4. The process control instrument of claim 2 wherein the trace line comprises a quarter wavelength trace line.

5. The process control instrument of claim 1 wherein the safety stub comprises a wire element.

6. The process control instrument of claim 1 wherein the intrinsic safety circuit further comprises a radial stub electrically connected to the transmission line.

7. The process control instrument of claim 1 wherein the safety stub has a length selected to resonate at a select frequency of interest.

8. The process control instrument of claim 1 wherein the safety stub comprises a trace line on the circuit board having a width of at least 2.0 mm.

9. The process control instrument of claim 1 wherein the safety stub comprises a trace line on the circuit board having a width of about 2.5 mm and a length of about 10 mm.

10. In a process control instrument comprising a circuit board having a radio frequency circuit for generating or receiving a high frequency signal and a radar antenna including an electrical conductor, the improvement comprising:

a distributed element safety circuit coupling the control circuit to the antenna comprising a high frequency transmission line on the circuit board electrically connecting the control circuit to the electrical conductor, and a safety stub having a first end electrically connected to the transmission line proximate the electrical conductor and a second end connected to a ground of the control circuit.

11. The process control instrument of claim 10 wherein the safety stub comprises a trace line on the circuit board.

12. The process control instrument of claim 11 wherein the second end of the trace line includes conductive vias connected to the ground.

13. The process control instrument of claim 11 wherein the trace line comprises a quarter wavelength trace line.

14. The process control instrument of claim 10 wherein the safety stub comprises a wire element.

15. The process control instrument of claim 10 wherein the safety circuit further comprises a radial stub electrically connected to the transmission line.

16. The process control instrument of claim 10 wherein the safety stub has a length selected to resonate at a select frequency of interest.

17. The process control instrument of claim 10 wherein the safety stub comprises a trace line on the circuit board having a width of at least 2.0 mm.

18. The process control instrument of claim 10 wherein the safety stub comprises a trace line on the circuit board having a width of about 2.5 mm and a length of about 10 mm.

* * * * *